United States Patent [19]

Venkatesan

[11] 4,253,728

[45] Mar. 3, 1981

[54] MULTIMODE ELECTRICALLY SWITCHED OPTICAL PORT

[75] Inventor: Thirumalai N. C. Venkatesan, Highland Park, N.J.

[73] Assignee: Bell Telephone Laboratories, Incorporated, Murray Hill, N.J.

[21] Appl. No.: 60,013

[22] Filed: Jul. 23, 1979

[51] Int. Cl.³ ............................................. G02B 5/14
[52] U.S. Cl. ............................ 350/96.15; 350/96.16; 350/352
[58] Field of Search ............... 350/96.14, 96.15, 96.16, 350/352

[56] References Cited

U.S. PATENT DOCUMENTS

| | | | |
|---|---|---|---|
| 3,905,676 | 9/1975 | Ulrich | 350/96.19 |
| 3,918,794 | 11/1975 | Milton | 350/96.16 |
| 4,003,629 | 1/1977 | Baües et al. | 350/96.14 |
| 4,008,947 | 2/1977 | Baües et al. | 350/96.14 |
| 4,127,320 | 11/1978 | Li | 350/96.15 |
| 4,130,342 | 12/1978 | McMahon | 350/96.14 |

OTHER PUBLICATIONS

R. A. Suref "Fiber-Optic Switching with Liquid Crystals" in *Proceedings of the S.P.I.E.*, vol. 176, Apr. 1929.
K. Minemura et al., "Two-way Transmission Experiments over a Single Optical Fiber at the Same Wavelength Using Micro-Optic 3dB Couplers" in *Electronics Letters*, vol. 14, No. 11, May 1978.

*Primary Examiner*—Stewart J. Levy
*Attorney, Agent, or Firm*—Sylvan Sherman

[57] ABSTRACT

Multimode switching is obtained in a four-port device having controllable switching means (22) comprising a thin Fabry-Perot interferometer including, within the cavity, a voltage controllable absorber (35). By the appropriate dimensioning of the cavity and orientation of the incident radiation, multimode operation is obtained.

4 Claims, 2 Drawing Figures

CONTROLLABLE SWITCHING MEANS

GRADED INDEX FIBER LENS    GRADED INDEX FIBER LENS

MULTIMODE ELECTRICALLY SWITCHED OPTICAL PORT

TECHNICAL FIELD

This invention relates to multimode optical switches.

BACKGROUND OF THE INVENTION

In a time-division multiplexed communication system serving many subscribers, the transmission and reception of messages at each terminal can be accomplished by the use of a variety of means including repeaters, directional couplers, taps and switches. Among the desirable properties of any such device are good coupling efficiency, low insertion loss, and transparency to the main stream message under failure of the terminal. Repeaters are generally more expensive and band limiting, and lack a built-in fail safe mechanism. Taps, on the other hand, have increasing insertion loss with increasing coupling efficiency and are mode dependent, while mode independent beam splitters tend to have higher insertion losses (>1.5 dB).

One can use planar electrooptic waveguide switches of the type disclosed, for example, in U.S. Pat. Nos. 4,003,629; 4,008,947 and 4,130,342. However, such devices tend to be single mode devices and at the present level of development exhibit losses of the order of 8 dB. In addition, the operating voltages for waveguide switches are much too high for fast switching applications, since fast, high voltage word generators are not commonly available.

In a paper entitled "Fiber-Optic Switching with Liquid Crystals" by R. H. Soref, published in the April, 1979 issue of the *Proceedings of the Society for the Photo Optical Instrumentation Engineers*, a switch is described which relies upon total or partial optical reflection by a liquid crystal layer in response to an applied electrical signal. Such devices, however, are not particularly efficient in that they tend to reflect a significant percentage of the input power in the transmitting mode. In addition, the switching frequency of such devices is very low. In this reference, the switching rate given is less than 500 Hz.

SUMMARY OF THE INVENTION

A switch, in accordance with the present invention, is a four-port device having controllable switching means comprising a thin Fabry-Perot interferometer including, within the cavity, a voltage controllable absorber. In the absence of an applied voltage, the intracavity absorption is low and, with the cavity tuned to the signal wavelength, transmission through the cavity is high. When a voltage is applied, the intracavity absorption increases, preventing intracavity constructive interference, thereby increasing the reflectivity of the device. In this state, through transmission is effectively blocked, permitting the simultaneous extraction of the incident main stream signal along a third branch of the device and the injection of a new message at a fourth branch. Thus, at each terminal, portions of the signal can be switched out of the message stream and a new message portion inserted in the vacant time slot.

By the appropriate dimensioning of the cavity and orientation of the incident radiation, multimode operation can be readily obtained.

It is an advantage of the present invention that approximately 90 percent of the incident power can be transmitted in the transmitting mode and reflected in the reflecting mode. It is a further advantage of the invention that it is capable of operating at switching rates in the 100s of megahertz range.

DETAILED DESCRIPTION

Figure 1:
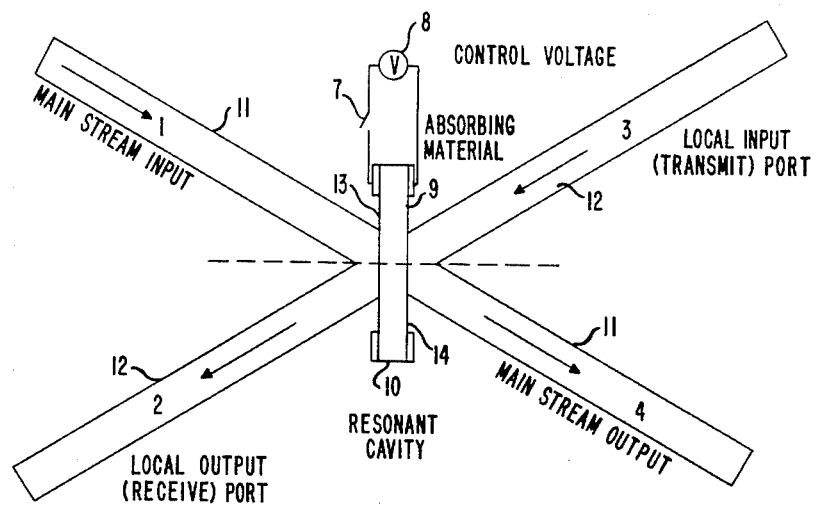
FIG. 1 shows a first embodiment of a switch in accordance with the invention.

FIG. 1, now to be considered, shows diagramatically the essential features of an optical switch in accordance with the invention. Basically, the switch comprises a thin Fabry-Perot interferometer 10 containing therein a voltage controllable absorber material 9. Materials of this type are characterized by a transition from a low absorbing state to a high absorbing state, which transition can be shifted by the application of an electric field. (The so-called "Franz-Keldysh" effect). Accordingly, switching means 7 are provided for applying a voltage source 8 across the material 9.

Interferometer 10 is located at the junction of a pair of intersecting multimode optical fibers 11 and 12. One of the branches of fiber 11, designated 1, is the main stream input branch. The opposite branch of fiber 11, designated 4, is the main stream output branch. Of the remaining branches, the branch of fiber 12 located on the same side of cavity 10 as branch 4 serves as the local input (transmit) port, and the fourth branch serves as the local output (receive) port. The later branches are designated 3 and 2, respectively.

With switch 7 open (i.e., no voltage applied across interferometer 10) the intracavity absorption is low, and with the cavity tuned to resonance at the wavelength of the signal, transmission between ports 1 and 4 is high. Accordingly, the main stream optical signal propagates freely along the main stream fiber 11. On the other hand, with switch 7 closed and a voltage impressed across the electro-absorbing material, the intracavity absorption is increased, preventing intracavity constructive interference. This results in increased reflectivity at the cavity surfaces 13 and 14 and, hence, increased coupling between input port 1 and local output port 2, and between local input port 3 and the main stream output port 4. Thus, at each node of the network at which a switch is located, any portion of the main stream signal can be switched out of the message stream and a new message simultaneously inserted in the vacated time slot without affecting the rest of the message stream.

As indicated hereinabove, by the appropriate proportioning and orientation of cavity 10, multimode operation can be obtained. In this regard, the many modes of the signal wave can be thought of as light rays having different angles of incidence. Assuming, for the moment that the fiber axis is normal to the cavity surface, (i.e., zero angle of incidence) one condition for good transmission through the switch for modes incident at different angles is given by $$\left(\frac{2\pi}{\lambda}\right) 2nt(1 - \cos\theta') < \frac{2\pi}{F} \tag{1}$$

where t is the thickness of the cavity;

$\theta'$ is the angle of incidence within the cavity;
$\lambda$ is the wavelength of the light;
and F is the finesse of the cavity.

This condition ensures that the difference in phase shift between a ray incident normal to the cavity and one incident at the maximum angle (defined by the NA of the fiber) is no greater than one instrument width of the cavity. Since the ray angle $\theta$ in air, as given by the numerical aperture of the fiber, is related to $\theta'$ by $\theta = n\theta'$, equation (1) reduces to $$t < (n\lambda/F\theta^2) \qquad (2)$$

For a typical multimode fiber for which $\theta_{max} \approx 0.23$, $F=10$ at $\lambda = 0.82$ $\mu$m and $n=3.6$, the preferred thickness of the device is less than 8 $\mu$m. However, as noted above, this calculation neglects the added effect of having the fibers oriented at an angle of incidence greater than zero. Thus, the cavity thickness for the arrangement of FIG. 1 is somewhat less than the value given by equation (2).

In addition, because the fibers are aligned at an angle with respect to the normal to the cavity surface, the internally reflected beam will not completely overlap the incident beam. To avoid a beam walk-off problem, the cavity thickness is limited by $$t < (nd_{coh}/2F \sin \phi) \qquad (3)$$

where
$d_{coh}$ is the coherence diameter of the output beam from a multimode fiber;
and $\phi$ is the angle made by the axis of the fiber and the normal to the cavity and is the average angle of incidence of the light from the fiber.

For a cavity of $n = 3.6$, $F = 10$, $\phi = 10$ and $d_{coh} = 1$ $\mu$m, we obtain $$t < 1 \ \mu m \qquad (4)$$

Equation (4) also implies a very thin cavity. To avoid this limitation and that imposed by equation (2) one can increase the coherence diameter and decrease the angle of incidence. Both these changes are obtained in the switch illustrated in FIG. 2 wherein a pair of graded-index fiber lenses 20 and 21 are interposed, respectively, between fibers 23 and 24 and one side 40 of controllable switching means 22, and between fibers 25 and 26 and the opposite side 41 of switching means 22. Additionally, the lenses are coaxially aligned along a common axis z—z.

Each fiber is terminated at a lens surface with its longitudinal axis normal thereto. Opposite pairs of fibers 23–25, and 24–26 are aligned such that their longitudinal axes, at the fiber-lens interfaces, are coaxial with axes y—y, and w—w, respectively, where said y—y and w—w axes are symmetrically disposed on opposite sides of the z—z axis.

The switching means 22 is a resonant cavity of the type described hereinabove. Each of the lenses 20 and 21 is a section of graded index fiber whose refractive index decreases in a parabolic fashion from a maximum value at its center to a minimum value at its outer edge.

Figure 2:
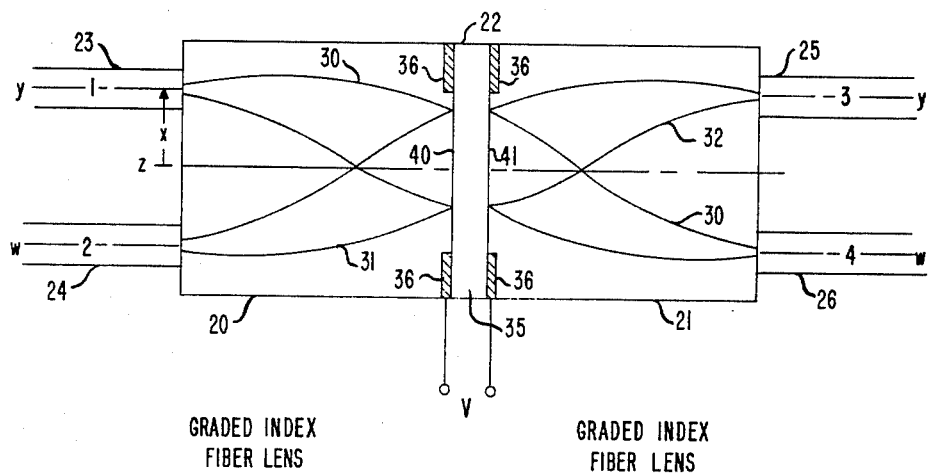
FIG. 2 shows an alternate embodiment of the invention.

As is known, an optical beam propagating longitudinally along such a graded index fiber lens follows a substantially sinusoidal path. In addition, the beam tends to diverge and converge at repetitive intervals related to the period of the sinusoidal path. In the embodiment of FIG. 2, the length of each lens 20 and 21 is equal to one-quarter of the period, L, of the sinusoidal path length. As such, a beam of light 30 emitted, for example, by fiber 23 traverses the switch along a path corresponding to half a sinusoid and couples into fiber 26. In addition, the beam width widens along the path, reaching a maximum width in the region of the cavity 22.

The effect of the above-described lens action upon the beam produces two improvements over the structure shown in FIG. 1. Because the beam width at the cavity is much larger than it is in the fiber, the coherence diameter, $d_{coh}$, is correspondingly larger. The second change is the reduction in the average angle of incidence, $\phi$, of the light at the cavity. For example, for a typical fiber lens, the exit beam diameter D and the exit angle $\alpha$ are given by $$D = \frac{2\theta}{n\sqrt{A}}, \qquad (5)$$

and $$\alpha = n\sqrt{A} \ x \qquad (6)$$

where
$\theta$ is the maximum entrance angle of a ray;
n is the value of the refractive index at the center of the fiber lens;
A is the coefficient of the power term defining the index profile of the fiber lens;
and x is the distance between the lens axis z—z and the entrance ray.

For a typical lens $\theta = 0.2$, $A = 0.26$ and $n = 1.545$. Assuming that the input fiber 23 has an outside diameter of 120 $\mu$m, a core diameter d of 60 $\mu$m and is spaced one fiber diameter from the z—z axis, one obtains for the worst case of $x = 210$ $\mu$m a value of $D = 1000$ $\mu$m, and $\alpha = 4.83°$. Thus, the beam incident upon the cavity and, hence, the coherence diameter are increased by a multiplication factor $M = D/d$. In addition, while the fibers are aligned normal to the input surface of the lenses, the rays make a maximum angle of incidence of 4.83° at the cavity surface. This, however, is very much smaller than the angle that could reasonably be obtained with the arrangement of FIG. 1.

With these improvements, i.e., increased $d_{coh}$ and reduced $\phi$, the cavity thicknesses, as given by equations (2) and (3) are increased to a more practical size. For the embodiment of FIG. 2, the limits on the preferred cavity thicknesses are given by $$t' < \frac{n\lambda}{2F\alpha} \qquad (7)$$

and $$t'' < \frac{nMd_{coh}}{2F \sin \alpha} \qquad (8)$$

It will be noted from equation (6) that $\alpha$ varies directly with x. Hence $\alpha$ is minimized by making the fiber displacement from the lens axis z—z as small as possible. Thus, in a preferred embodiment, adjacent fibers 23, 24 and 25, 26 are placed as close together as is practical.

In the reflection mode, the incident beam 30 is reflected at the cavity and focused onto fiber 24 along a path 31. Similarly, an incident beam 32 from fiber 25 can be transmitted through the cavity to fiber 24 or reflected to fiber 26.

While bulk material can be used as the voltage controllable absorber, power loss can be significantly reduced by the inclusion of a back-biased junction to reduce the current drain. For example, GaAs heterostructures as thin as 5 μm have been grown by the MBE method and are readily formed into Fabry-Perot structures because of their flatness and uniformity of growth. With high (90%) reflective coatings, cavities with finesse in excess of 16 have been fabricated. By utilizing the Franz-Keldysh effect, absorption length changes of one to two orders of magnitude have been attained with the application of electric fields of from $10^4$ v/cm to $10^5$ v/cm. In a 5 μm device, this is obtained by an external voltage of 5 to 50 volts. Thus, with a zero-voltage absorption length of 10 $cm^{-1}$ and a maximum voltage absorption length of 1000 $cm^{-1}$, a 5 μm cavity with 90% reflective mirrors would ideally have a 0.5 dB insertion loss in the transmission mode, less than 0.5 dB loss in the reflection mode, and a 16 dB crosstalk reduction between opposing ports.

I claim:

1. An optical switch comprising:
   controllable switching means 22 for transmitting or reflecting incident optical wave energy;
   first and second optical wavepaths (23, 24) disposed on one side of said switching means (22);
   third and fourth optical wavepaths (25, 26) disposed on a second side of said switching means (22) opposite said one side;
   said first and second wavepaths (23, 24), and said third and fourth wavepaths (25, 26) being aligned for receiving reflected wave energy from each other when said switching means (22) is in the reflecting state;
   said first and fourth wavepaths (23, 26), and said second and third wavepaths (24, 25) being aligned for receiving transmitted wave energy from each other when said switch is in the transmitting state;
   CHARACTERIZED IN THAT said controllable switching means (22) comprises:
   a resonant cavity tuned to the wavelength of the incident optical wave energy, and including a voltage controllable absorber material (35) therein;
   and means (36) for applying a voltage across said material for switching said switch between its reflecting and transmitting states.

2. The switch according to claim 1 wherein said optical wavepaths (11, 12, 13, 14) intersect at a common angle of incidence at the surfaces of said switching means (10).

3. The switch according to claim 1 including
   a first graded index fiber lens 20 disposed between said first and second wavepaths (23, 24) and said switching means (22);
   and a second graded index fiber lens (21) disposed between said third and fourth wavepaths (25, 26) and said switching means (22).

4. The switch according to claim 3 wherein the cavity thickness is given by $$t < n\lambda/2F\alpha$$

where
   n is the refractive index of the cavity material;
   F is the finesse of the cavity;
   λ is the signal wavelength
   and α is the ray exit angle from the lens.

* * * * *